(12) United States Patent
Krumhansl et al.

(10) Patent No.: US 7,440,853 B2
(45) Date of Patent: Oct. 21, 2008

(54) SYSTEMS AND METHODS FOR DETECTING SHALLOW BURIED OBJECTS

(75) Inventors: Peter A. Krumhansl, Amherst, NH (US); Michael B. Goldsmith, Framingham, MA (US)

(73) Assignee: BBN Technologies Corp., Cambridge, MA (US)

( * ) Notice: Subject to any disclaimer, the term of this patent is extended or adjusted under 35 U.S.C. 154(b) by 31 days.

(21) Appl. No.: 11/582,222

(22) Filed: Oct. 16, 2006

(65) Prior Publication Data

US 2008/0091353 A1    Apr. 17, 2008

(51) Int. Cl.
*G06F 19/00* (2006.01)
(52) U.S. Cl. .......................... 702/14; 367/56
(58) Field of Classification Search .............. 702/14, 702/2, 5; 367/56, 117
See application file for complete search history.

(56) References Cited

U.S. PATENT DOCUMENTS 6,026,135 A * 2/2000 McFee et al. ............... 376/159
6,536,553 B1 * 3/2003 Scanlon ..................... 181/108

* cited by examiner

*Primary Examiner*—Edward Raymond
(74) *Attorney, Agent, or Firm*—Ropes & Gray LLP

(57) ABSTRACT

The invention relates to a seismic system having an array of nodes, each capable of emitting and detecting seismic signals. The array of nodes is mounted on a mobile platform in a certain geometry and is configured to acquire subsurface data, and more particularly detect shallow buried objects, while being translated over a surface. Such a seismic system allows for high subsurface point redundancy by providing a large number of channels of data used to sum the energy at a point in the subsurface. In other aspects, the invention relates to methods for processing the acquired data to increase signal-to-noise ratio. In still other aspects, the invention relates to methods for imaging the data for visualization on a display.

28 Claims, 8 Drawing Sheets

SYSTEMS AND METHODS FOR DETECTING SHALLOW BURIED OBJECTS

BACKGROUND

Many high valued objects are buried near the surface of the earth in soil. These include utility lines and equipment, unexploded ordnance, tunnels, coffins and graves, hazardous waste and more. Seismic detection of small buried objects shallower then 20 ft has been occasionally successful but has not been reduced to a standard practice. It has proven difficult because of the high frequencies of seismic waves required—up to 2500 Hz.

Seismic detection is also made more difficult because of heterogeneity often encountered near the surface of the soil. The heterogeneous soil conditions cause variations in coupling of seismic sources and receivers with the soil. The heterogeneous soil conditions also impact seismic wave velocities and contribute to noise in seismic measurements. These factors typically result in significant losses in seismic signals.

Exploration Seismic Reflection profiling and the standard Common Depth Point seismic acquisition can have subsurface point redundancy or "fold" of 60 or more, i.e. there are 60 channels of data used to sum the energy at one point in the image. This redundancy improves signal to noise ratios, overcoming seismic noise. Near surface targets must be detected in relatively higher levels of seismic reverberation. For seismic detection of shallow objects in the top 20 feet, much higher values of redundancy are necessary to achieve the array gain and bring signal above the scattered reverberation off the heterogeneities.

Improved systems and methods for detecting shallow buried objects is desired.

SUMMARY OF THE INVENTION

The systems and methods described herein include improved systems and methods for detecting shallow buried objects.

In one aspect, the invention relates to a seismic system having an array of nodes, each capable of emitting and detecting seismic signals. The array of nodes is mounted on a mobile platform in a certain geometry and is configured to acquire subsurface data, and more particularly detect shallow buried objects, while being translated over a surface. Such a seismic system allows for high subsurface point redundancy by providing a large number of channels of data used to sum the energy at a point in the subsurface. In other aspects, the invention relates to methods for processing the acquired data to increase signal-to-noise ratio. In still other aspects, the invention relates to methods for imaging the data for visualization on a display.

More particularly, in one aspect, the systems and methods described herein include methods of subsurface imaging. The methods may comprise the steps of providing an array of nodes including, at least a first node and a second node that are each capable of emitting and detecting signals, and acquiring a set of array seismic data. The array of nodes may include five or more nodes, each capable of emitting and detecting signals. The set of array seismic data may be acquired by iteratively positioning the array of nodes adjacent a surface, at a first location, acquiring a first set of seismic data corresponding to the first location and acquiring a second set of seismic data corresponding to the first location. The first set of seismic data may be acquired by emitting a source signal by the first node at the first location and detecting a first response signal by the second node. The second set of seismic data may be acquired by emitting a source signal from at least the second node in the array of nodes and receiving a response signal in at least the first node in the array of nodes. In certain embodiments, the array of nodes includes a plurality of nodes and is configured to acquire at least 500 sets of seismic data.

In certain embodiments, the method further comprises moving the array of nodes to another location and repeating the steps of emitting by the first node and emitting by the second node. In such embodiments, the array of nodes includes a plurality of nodes and is configured to acquire at least 500 sets of seismic data.

In certain embodiments, the method comprises identifying imperfections in the first and second sets of seismic data, at least in part, by comparing the first set of seismic data with the second set of seismic data. In such embodiments, comparing the first set of seismic data with the second set of seismic data includes cross correlating the first set of seismic data with the second set of seismic data and examining a normalized cross correlation coefficient to identify imperfections. The imperfections in the set of array seismic data may include at least one of the variation of seismic coupling between the surface and at least one of the first node and second node, delay and/or distortion of the source signal due to near surface subsurface heterogeneity, interfering waves, seismic reverberation and random noise.

In certain embodiments, the method further comprises imaging the subsurface by altering at least one of the first and second sets of seismic data based, at least in part, on the identified imperfections. In certain embodiments, altering at least one of the first and second sets of data includes normalizing the identified imperfections. The subsurface may include at least one object and the method may further comprise detecting a subsurface object based, at least in part, on the imaged subsurface.

Additionally and optionally, identifying imperfections may include calculating a time delay associated with at least one of the first node and the second node by subtracting a time delay of the first set of seismic data from a time delay of the second set of seismic data. The method may further comprise imaging the subsurface by altering at least one of the first and second sets of seismic data based, at least in part, on the identified imperfections. In certain embodiments, altering at least one of the first and second sets of seismic data includes removing the time delay associated with the first node and the time delay associated with the second node.

Additionally and optionally, identifying imperfections includes correlating the first set of seismic data with the second set of seismic data and calculating a transfer function associated with the first node and a transfer function associated with the second node by decomposing the correlation of the first set and second sets of seismic data. The method may further comprise imaging the subsurface by altering at least one of the first and second sets of seismic data based, at least in part, on the identified imperfections. In certain embodiments, altering at least one of the first and second sets of seismic data includes removing the transfer function associated with the first node and the transfer function associated with the second node.

In certain embodiments, the source signal is emitted to a region below the surface and the response signal includes a component of the source signal modified by interactions with the region below the surface. In such embodiments, the response signal further includes a component corresponding to the effect of seismic coupling between the surface and at least one of the first node and second node.

In another aspect, the systems and methods described herein include an apparatus for imaging a subsurface volume. The apparatus comprises an array of nodes for acquiring a set of array seismic data, and a computer in communication with the array of nodes for processing and imaging the acquired data. The array of nodes may include at least a first node and a second node, each capable of emitting and detecting signals. The array of nodes may be adapted to acquire a first set of seismic data by emitting a source signal from the first node and detecting a response signal at the second node, and a second set of seismic data by emitting a source signal from the second node and detecting a response signal at the first node. The computer may be configured to identify imperfections in the first and second sets of seismic data and image the subsurface by removing imperfections in at least one of the first and the second sets of seismic data.

In certain embodiments, the array of nodes includes five or more nodes. The nodes in the array of nodes may be separated by a distance of about 20 cm. In other embodiments, the array of nodes includes a motion module for moving the array from one location to another location. In such embodiments, the motion module includes at least one of a wheel, a roller, a motor and an electronic motor controller circuit.

In certain embodiments, the computer includes a data processing application for processing acquired data. The computer may also include a data imaging application for imaging the acquired data. Additionally and optionally, the computer may include an array control application for controlling the movement of the array of nodes.

BRIEF DESCRIPTION OF THE DRAWINGS

The following figures depict certain illustrative embodiments of the invention in which like reference numerals refer to like elements. These depicted embodiments may not be drawn to scale and are to be understood as illustrative of the invention and not as limiting in any way.

DETAILED DESCRIPTION OF CERTAIN ILLUSTRATIVE EMBODIMENTS

To provide an overall understanding of the invention, certain illustrative embodiments will now be described, including display apparatus and constituent components thereof. However, it will be understood by one of ordinary skill in the art that the apparatus described herein may be adapted and modified as is appropriate for the application being addressed and that the systems and methods described herein may be employed in other suitable applications, and that such other additions and modifications will not depart from the scope hereof.

As will be seen from the following description, in one aspect, the invention relates to a seismic system having an array of nodes, each capable of emitting and detecting seismic signals. The array of nodes is mounted on a mobile platform in a certain geometry and is configured to acquire subsurface data while being translated over a portion of a surface being surveyed. Such a seismic system allows for high subsurface point redundancy by providing a large number of channels of data used to sum the energy at a point in the subsurface. In other aspects, the invention relates to methods for processing the acquired data to increase signal-to-noise ratio. In still other aspects, the invention relates to methods for imaging the data for visualization on a display.

Figure 1:
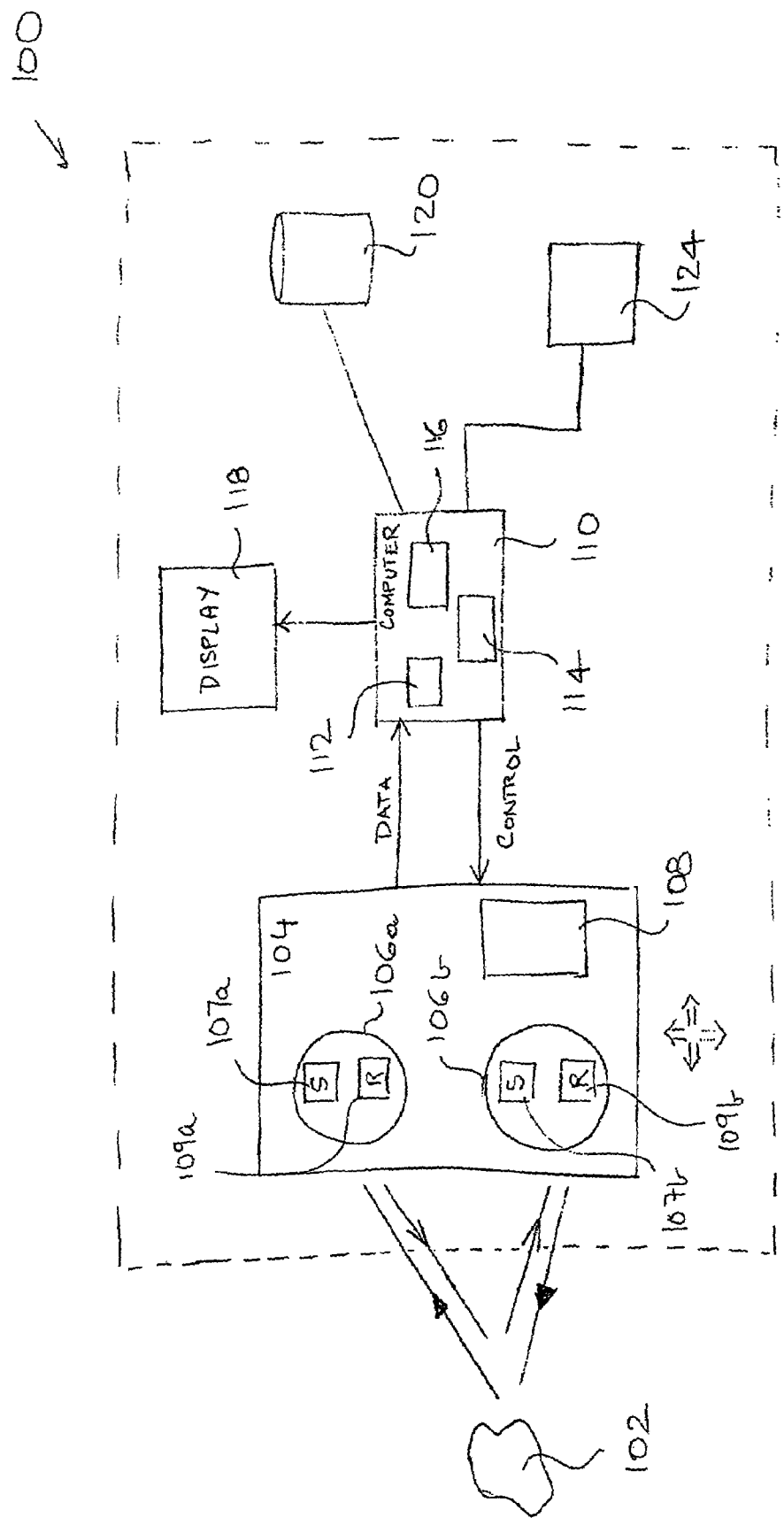
FIG. 1 is a block diagram depicting a seismic system for detecting buried objects, according to an illustrative embodiment of the invention.

FIG. 1 is a block diagram depicting a seismic system 100 for detecting buried objects 102, according to an illustrative embodiment of the invention. The seismic system 100 includes a seismic array 104, a computer system 110 and a display 118. The seismic array 104 is typically positioned adjacent to a surface and includes nodes 106a and 106b (generally, "nodes 106"). Each node 106 includes a seismic source 107a and 107b and seismic receiver, 109a and 109b for emitting and detecting seismic signals, respectively. In certain embodiments, each node 106 includes a coincident seismic source 107a and 107b and a seismic receiver 109a and 109b for emitting and detecting signals, respectively. During surveying, seismic signals are emitted from node 106a and detected at node 106b, and/or vice versa. In certain embodiments, a portion of the detected signals includes emitted signals that are reflected from a buried object 102. The seismic array 104 also includes a motion module 108 for translating the array in one or more directions along the surface. Subsurface data collected by the array 104 is sent to a computer system 110. The computer system 110 includes various functional applications for collecting and processing data, and for operating the array 104. The functional applications include a data processing application 112, an array control application 114 and a data imaging application 116. In certain embodiments, the functional applications include a signal recording application. The computer system 110 is connected to a display 118 for displaying the collected and/or processed data. The data is also stored in database 120 for future reference and further processing. The computer is connected to an external network interface 124 for communicating with external networks such as the Internet.

The seismic signals include seismic waves that travel through soil and/or rock, and allow for analysis of structures beneath the Earth's surface. In alternative embodiments, the seismic signals, and therefore, the seismic system 100 allows for analysis of structures beneath the surface of any planetary body (e.g., beneath the surface of the Moon or Mars) without departing from the scope of the invention. Seismic waves include at least one of P-waves, S-waves, and surface waves. P-waves, travel fast and are typically among the first waves to be measured. P-waves are pressure or compressional waves that move (propagate) through a material by alternately compressing and expanding (dialating) materials. S-waves, also called Shear waves or secondary waves, typically travel slower than P-waves. A source may send seismic signals into the Earth that consequently reflect off of subsurface rock interfaces as well as buried objects. In certain embodiments, a seismic source includes at least one of gun sources, impact sources and explosive sources. A seismic source for producing repetitive pulses of seismic energy from air guns is described in U.S. Pat. No. 3,687,218 to S. F. Ritter, which is herein incorporated by reference in its entirety. Another seismic receiver system is disclosed in U.S. Pat. No. 4,422,164 to Bowden et al., which is herein incorporated by reference in its entirety. The reflected seismic signals are measured by a suitable seismic receiver such as a geophone or a seismometer. In certain embodiments, the seismic signals emitted and detected have a frequency of about 2500 Hz. In other embodiments, the seismic signals emitted and detected have frequencies greater than and less than 2500 Hz without departing from the scope of the invention.

The array 104 typically includes a plurality of nodes 106 each equipped with seismic sources 107 and receivers 109 capable of emitting and detecting seismic signals. The nodes include seismic sources 107 and receivers 109 such as those described in the U.S. provisional application for an "Apparatus and Method for Generating a Seismic Signal and Measuring a Response to Same" filed on Apr. 6, 2006 with Express Mailing label EV817397279US, which is herein incorporated by reference in its entirety. In certain embodiments, the nodes 106 are equipped with any suitable seismic sources 107 and receivers 109 capable of emitting and detecting seismic signals without departing from the scope of the invention. In certain embodiments, the array 104 includes a two-dimensional distribution of nodes. In such embodiments, the nodes are spaced apart to be spatially unaliased over a significant proportion of the seismic bandwidth. In certain embodiments, the centers of the nodes 106 are separated by a distance of about 20 cm.

The array 104 also includes motion module 108 to move the array from one location to another. In certain embodiments, the motion module 108 includes a set of wheels or rollers, a set of motors, suitable electronic motor controller circuits and power supply units for controlling the movement of the array. The array 104 also includes a communication device to interface with the computer system 110. The communication device allows the array 104 to send data acquired from surveying to the computer system 110. The communication device also allows the computer system 110 to send command signals to control the movement of the array 104 and the operation of the seismic sources and receivers on the nodes. In one embodiment, the communication device includes a wireless transmitter and receiver for sending and receiving information. In other embodiments, the communication device includes a wired interface for sending and receiving information from the computer system 110. Additionally and optionally, the array 104 is equipped with sensors for monitoring various other parameters such as temperature, pressure, humidity, atmospheric gas content or Earth surface chemistry. In certain alternative embodiments, the seismic system 100 is configured as an integrated device. In such embodiments, the array 104 and the computer system 110 and/or the display 118 are integrally formed together. As an example, the seismic system 100 may include a computer system 110 mounted on the array 104.

Figure 2:
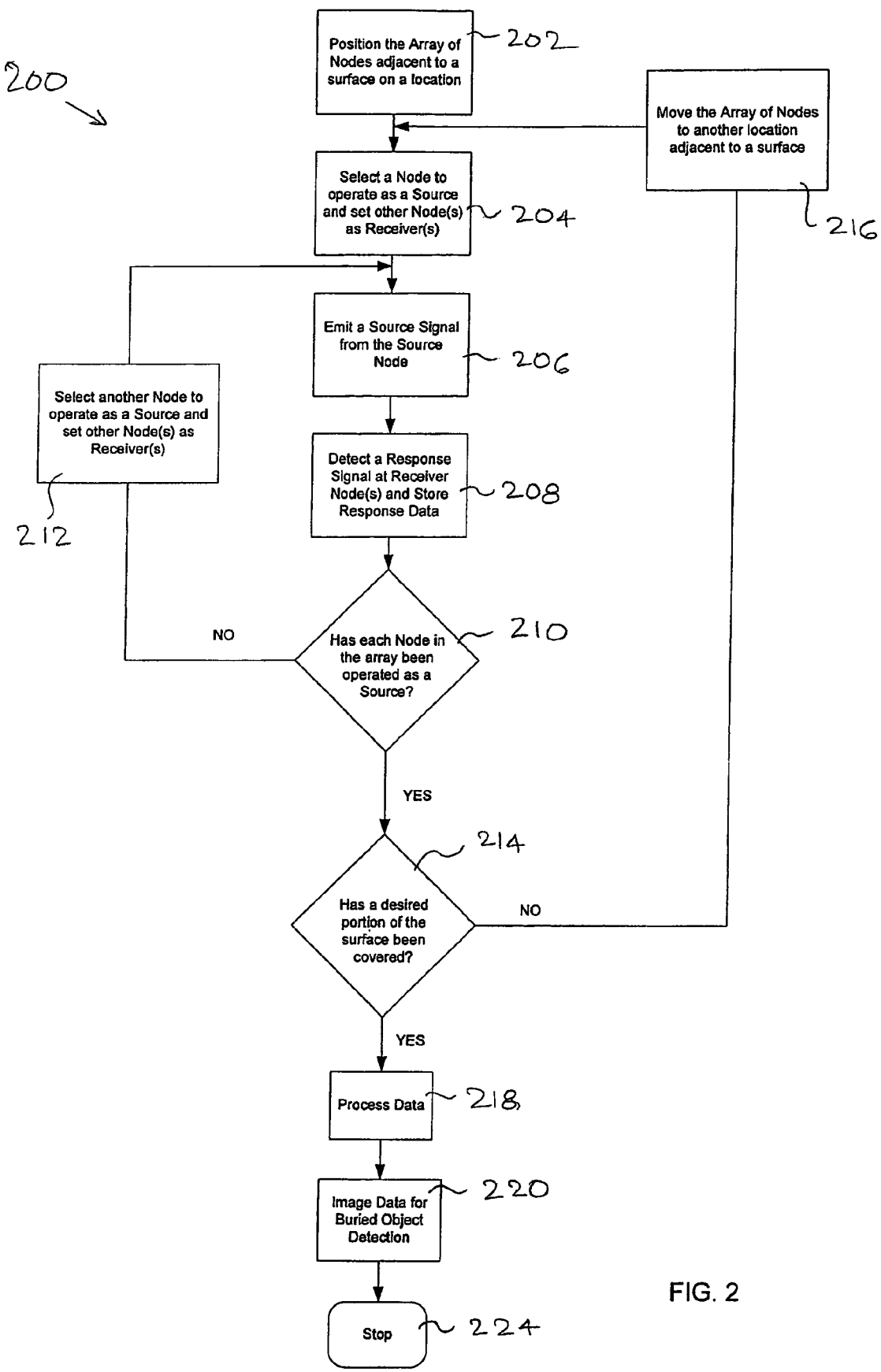
FIG. 2 is a flow chart depicting the operation of the seismic system of FIG. 1, according to an illustrative embodiment of the invention.

FIG. 2 is a flow chart depicting a method of operation 200 of the seismic system 100 of FIG. 1, according to an illustrative embodiment of the invention. The array 104, including nodes 106, is positioned adjacent to a surface on a location (step 202). The array control application 114 in the computer system 110 configures a node 106 in the array to operate as a source and configures the remaining nodes 106 to operate as receivers (step 204). To begin surveying, the source node 106 emits a seismic signal into the surface such that the signal penetrates beneath the surface (step 206). The one or more receiver nodes 106 detect a response signal (step 208); the response signal includes, among other things, a portion of the emitted signal reflected from a buried object. The seismic system 100 determines if all the nodes in the array have been operated as a source at least once (step 210). If not, then a node 106 that hasn't yet been operated as a source is selected as a source node 106 and the remaining nodes 106 are selected as receiver nodes 106 (step 212) and the steps of surveying are repeated. In one embodiment, each of the nodes in the array are provided the opportunity to operate as a source at least once. For example, if there are four nodes in the array, then there are four repetitions of the surveying process with each of the four nodes operated as a source once.

Once each of the nodes in the array have functioned as a source node, the array is moved to another location. The seismic system 100 determines if a desired portion of the surface has been surveyed (step 214). In certain embodiments, the portion of the surface being surveyed is larger than the physical size of the seismic array 104. In such embodiments, more data about the subsurface is obtained by moving the array to another location on the surface (step 216). The surveying process (steps 204-212) is repeated for this new location. The seismic array 104 sends the data acquired from surveying to the computer system 110. The acquired data includes data from each of the receivers when each of the nodes 106 were operated as sources for each of the locations of the array 104. The data processing application 112 in the computer system 110 processes the data to remove certain unwanted characteristics in the data (step 218). The processed data is sent to the data imaging application 116 where it is converted to a format suitable for visualization on the display 118 (step 220).

Figure 3:
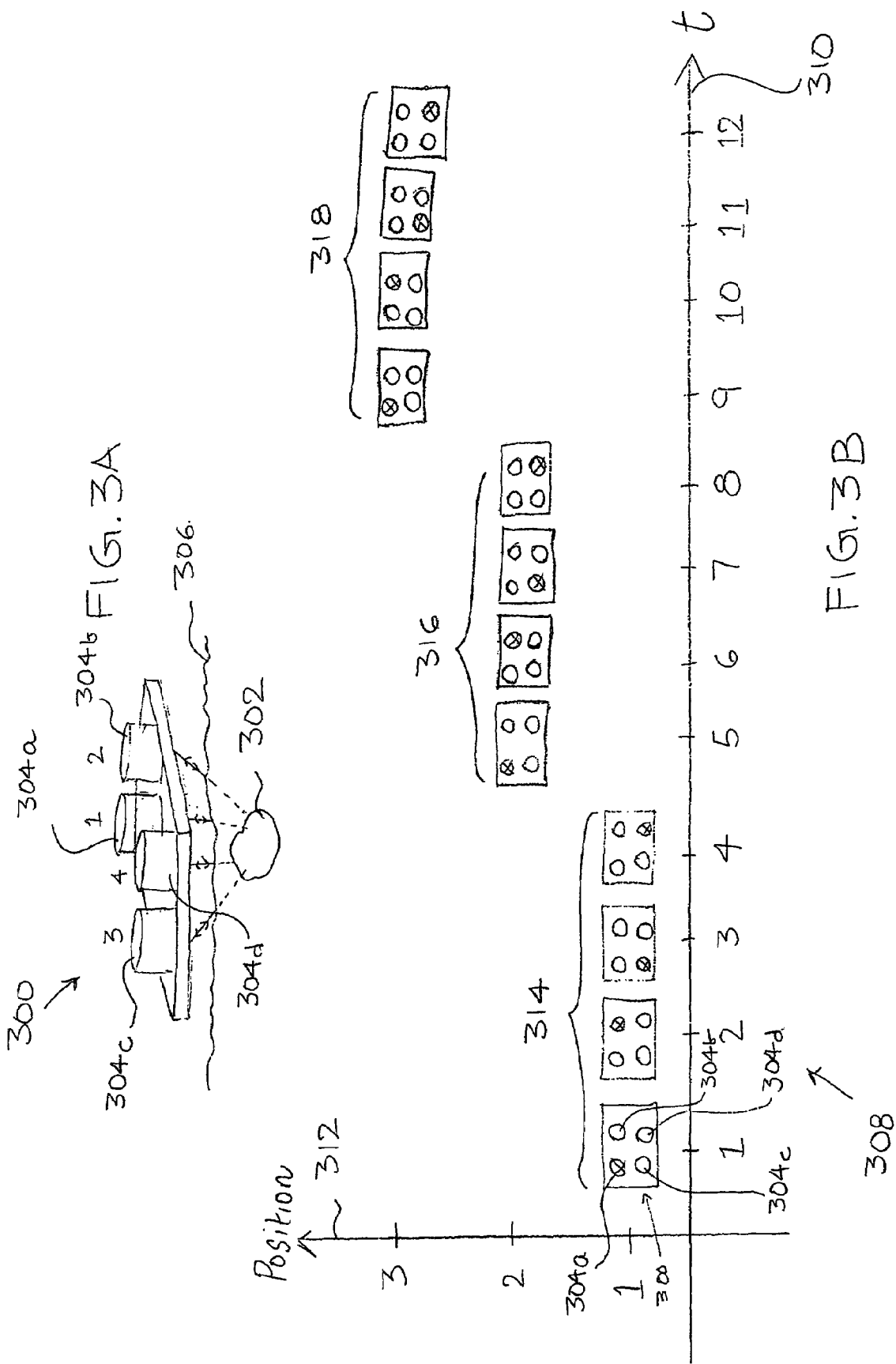
FIG. 3A depicts a seismic array for detecting buried objects, according to an illustrative embodiment of the invention.
FIG. 3B is a chart showing a sequence of operation of the seismic array of FIG. 3A, according to an illustrative embodiment of the invention.

FIGS. 3A and 3B depict an example of surveying a portion of the land with a seismic system similar to system 100 in FIG. 1. In particular, FIG. 3A depicts a seismic array 300 for detecting buried objects 302, according to an illustrative embodiment of the invention. The seismic array 300 is similar to array 104 in FIG. 1. The seismic array 300 is positioned adjacent to a surface 306 and includes nodes 304a-304d, each capable of emitting and detecting seismic signals. FIG. 3B is a chart showing a sequence for operating the seismic array 300 of FIG. 3A and acquiring data, according to an illustrative embodiment of the invention. The horizontal axis 310 shows increments of time and the vertical axis 312 depicts position. At various instances in time, the array 104 is placed in a different position and/or operated differently such that a different node is operated as a seismic source. The increments of time used may be any one of fractions of seconds, seconds, minutes, hours or days. The increments of time marked on the axis 310 are merely illustrative and may be any suitable unit of time without departing from the scope of the invention. In certain embodiments, the time markers on axis 310 correspond to a fixed or variable time period rather than a particular instance in time. The positions marked on the axis 312 are also merely illustrative and may be any suitable unit of distance without departing from the scope of the invention. The position markers may depend on the spatial arrangement of the array 104 and the spacing between the nodes 106 in the array 104.

The array 300 is initially placed at about position, p=1, just prior to operation. During the time period from t=1 to t=4, the array is placed at position, p=1, and a different node is designated as a source for each time instance. At about time, t=1, node 304a is operated as a source and emits a seismic signal into the surface. During this time instance, each of the other nodes 304b, 304c and 304d function as receivers and detect response signals obtained from beneath the surface 306. In certain embodiments, the array 300 includes memory. In such embodiments, the detected response signals may be stored in the memory of array 300. Alternatively, the detected response signal may be sent to a computer system 110 for digitization, storage, processing and display. At the next time instance, t=2, node 304b is operated as a source and emits a seismic signal into the surface, and nodes 304a, 304c and 304d function as receivers and detect response signals obtained from beneath the surface 306. At time instances, t=3 and t=4, nodes 304c and 304d are operated as a sources, respectively. At time, t=3, nodes 304a, 304b and 304d are operated as receivers and at t=4, nodes 304a, 304b and 304c are operated as receivers.

Between time t=4 and time t=5 the array 300 is moved to position, p=2. During the time period from t=5 to t=8, each of the nodes 304a-304d is operated as a source and signals are detected by each of the other nodes 304 similar to data acquisition during the time period from t=1 to t=4. Between time t=9 and time t=12, the array 300 is moved to position, p=3, and the process is repeated, whereby each of the nodes is operated as a source and data is acquired. For each position, there are about four sites on the surface being surveyed corresponding to the position of the 4 nodes. Therefore, since there are three distinct positions for the four node array 300, there are about twelve sites on the surface that have been surveyed. Since the location of a site corresponds to a location at which a node was placed, each site would have been used to detect signals three times. This is because, each node 304 on the array 300 functions as a source once and a receiver three times for each position. Therefore, if data was collected when the nodes function as receivers, there are three sets of data for each site and thirty-six data sets for the entire surface of twelve sites being surveyed. In other words, an object 302 lodged below the surface 306 would have been surveyed thirty-six times from different nodes, giving thirty-six channels of redundancy and thereby improving signal-to-noise ratio. In general, if there are N nodes 106 in the array and the array is passed over K different positions, then there are $K \times (N) \times (N-1)$ channels of redundancy. As an another example, an array having twelve nodes and passed over 20 different positions generates about 2640 channels of redundancy. In certain embodiments, the array 300 generates over 500 channels of data in about a square-meter of surface area. The data acquired from the receiver nodes are sent to the computer system 110 for further processing and display.

Figure 4:
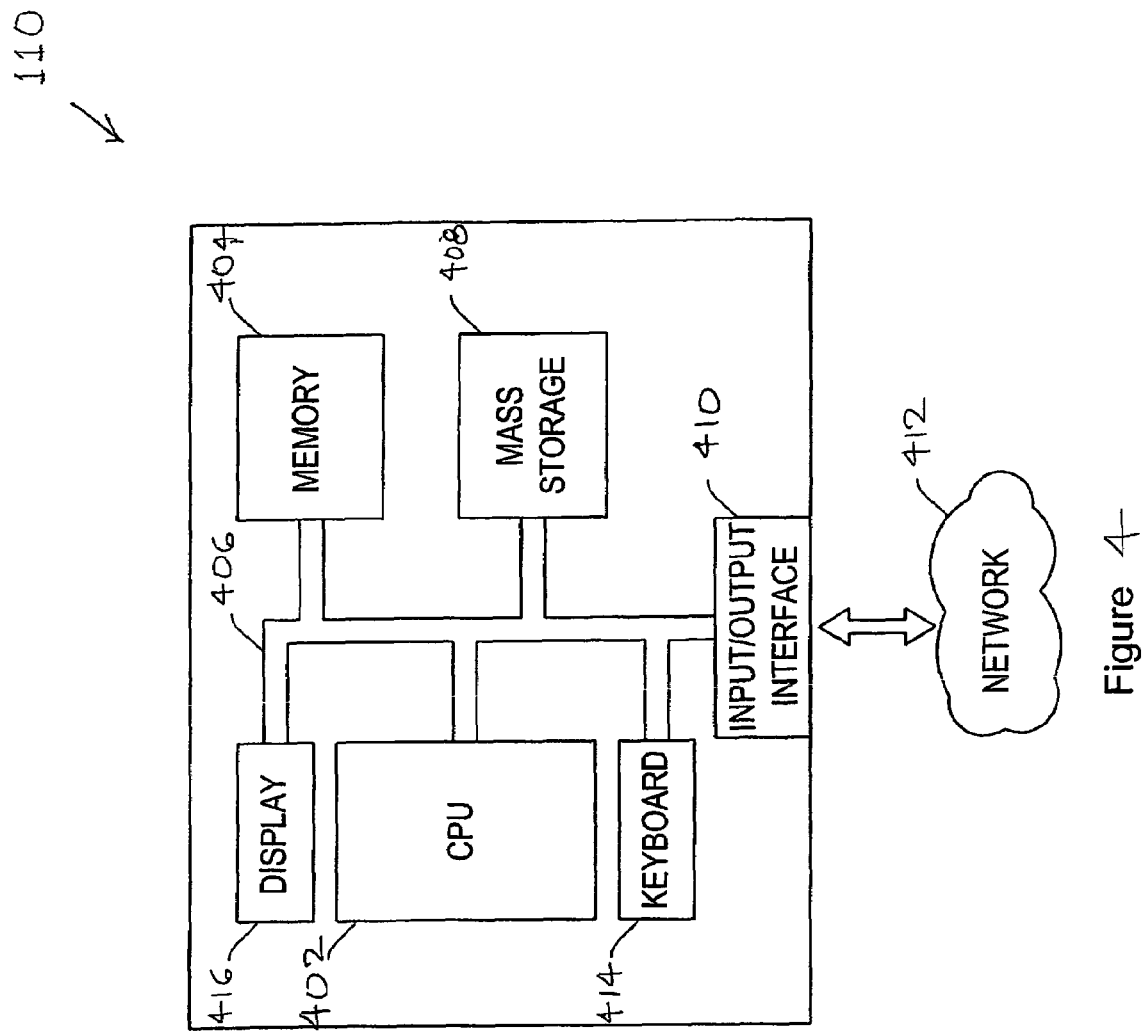
FIG. 4 is a block diagram depicting the physical components of a computer system, according to an illustrative embodiment of the invention.

FIG. 4 is a block diagram depicting the physical components of a computer system 110, according to an illustrative embodiment of the invention. The exemplary computer system 110 includes a central processing unit (CPU) 402, a memory 404, and an interconnect bus 406. The CPU 402 may include a single microprocessor or a plurality of microprocessors for configuring computer system 110 as a multiprocessor system. The memory 404 illustratively includes a main memory and a read only memory. The computer 110 also includes the mass storage device 408 having, for example, various disk drives, tape drives, etc. The main memory 404 also includes dynamic random access memory (DRAM) and high-speed cache memory. In operation, the main memory 404 stores at least portions of instructions and data for execution by the CPU 402.

The mass storage 408 may include one or more magnetic disk or tape drives or optical disk drives, for storing data and instructions for use by the CPU 402. At least one component of the mass storage system 408, preferably in the form of a disk drive or tape drive, stores the database used for processing the imaging and targeting of system 100 of the invention. The mass storage system 408 may also include one or more drives for various portable media, such as a floppy disk, a compact disc read only memory (CD-ROM), or an integrated circuit non-volatile memory adapter (i.e. PC-MCIA adapter) to input and output data and code to and from the computer system 110.

The computer system 110 may also include one or more input/output interfaces for communications, shown by way of example, as interface 410 for data communications via the network 412. The data interface 410 may be a modem, an Ethernet card or any other suitable data communications device. To provide the functions of a computer 104 according to FIG. 1, the data interface 410 may provide a relatively high-speed link to a network 412, such as an intranet, internet, or the Internet, either directly or through an another external interface 116. The communication link to the network 412 may be, for example, optical, wired, or wireless (e.g., via satellite or cellular network). Alternatively, the computer system 110 may include a mainframe or other type of host computer system capable of Web-based communications via the network 412.

The computer system 110 also includes suitable input/output ports or use the interconnect bus 406 for interconnection with a local display 416 and keyboard 414 or the like serving as a local user interface for programming and/or data retrieval purposes. Alternatively, server operations personnel may interact with the system 110 for controlling and/or programming the system from remote terminal devices via the network 412.

The computer system 110 may run a variety of application programs and stores associated data in a database of mass storage system 408. One or more such applications may enable the receipt and delivery of messages to enable operation as a server, for implementing server functions relating to imaging and tracking the contacts 118 of FIG. 1.

In certain embodiments, the CPU 402 includes circuitry for an analog-to-digital converter and/or a digital-to-analog converter. In such embodiments, the analog-to-digital converter circuitry converts analog seismic signals received at the node to digital signals for further processing by the computer system 110.

The components contained in the computer system 110 are those typically found in general purpose computer systems used as servers, workstations, personal computers, network terminals, and the like. In fact, these components are intended to represent a broad category of such computer components that are well known in the art. Certain aspects of the invention may relate to the software elements, such as the executable code and database for the server functions of the imaging and tracking system.

It will be apparent to those of ordinary skill in the art that methods involved in the present invention may be embodied in a computer program product that includes a computer usable and/or readable medium. For example, such a computer usable medium may consist of a read only memory device, such as a CD ROM disk or conventional ROM devices, or a random access memory, such as a hard drive device or a computer diskette, having a computer readable program code stored thereon.

Figure 5:
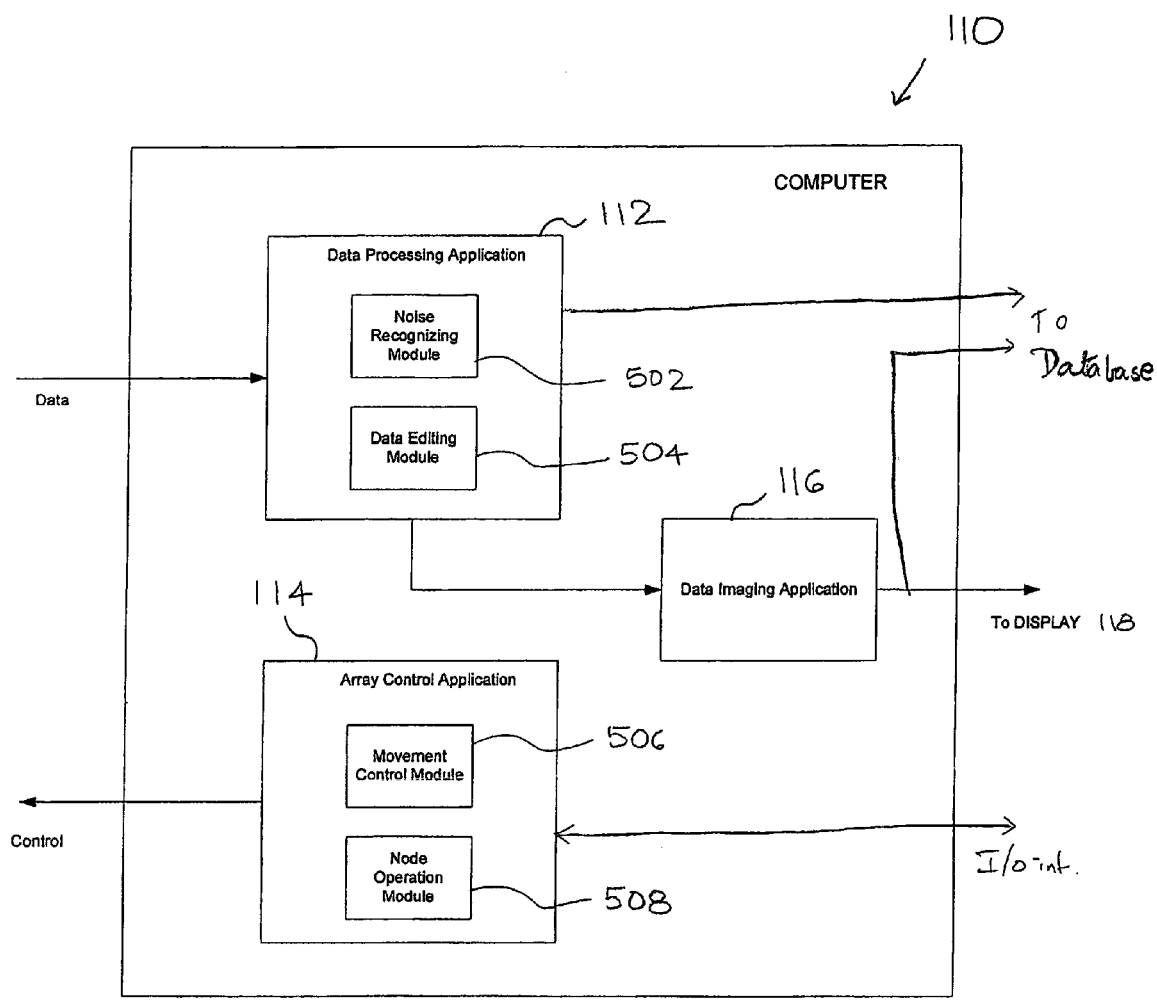
FIG. 5 is a block diagram depicting the functional modules of a computer system, according to an illustrative embodiment of the invention.

FIG. 5 is a block diagram depicting the functional modules of the computer system 110, according to an illustrative embodiment of the invention. The computer system 110 includes a data processing application 112, an array control application 114 and a data imaging application 116. The data processing application 112 includes a noise recognition module 502 and a data editing module 504. The array control application 114 includes a movement control module 506 and a node operation module 508. The array 104 of FIG. 1 acquires and sends subsurface data from each of the nodes to the data processing application 112. The data processing application 112 identifies noise characteristics in the data and then processes the data to eliminate the noise. In particular, the noise recognition module 502 includes software and/or hardware for particularly identifying undesired characteristics and artifacts in the data arising from imperfections in the array 104 as well as heterogeneities in the surface. The data editing module 504 alters the data to remove, or reduce, the effects of these undesired characteristics. A data processing application 112 may be created and implemented using software languages including, but not limited to, C, C++, JAVA. Interactive software modules may also be included in the data processing application 112 that may assist users with reviewing and processing data.

The array control application 114 is responsible for controlling the movement of the array 104 and operation of the nodes 106 on the array 104. The array control application 114 sends control signals to the array 104 with instructions for at least one of direction, speed and time. In certain embodiments, the array control application 114 is in communication with an external user interface, thereby allowing a person or any external entity to control the array 104. The movement control module 506 includes hardware and software components for controlling the array 104. In particular, movement control module 506 sends control signals to the array 104 that carry information about at least one of direction, speed, time. The array 104 movement noted earlier in FIGS. 2, 3A and 3B are made possible by the movement control module 506. The node operation module 508 is responsible for operating the individual sources and receivers on individual nodes. The node operation module 508 includes algorithms for implementing a sequence of operation for each node whereby each node takes turns to operate as a source while the remaining nodes operate as receivers.

The computer system 110 also includes data imaging application 112 for converting the acquired and/or processed data to a format suitable for visualization on display 118. More particularly, the data imaging application 112 includes hardware and software components to combine the plurality of redundant data sets obtained from scanning the array 104 across a surface and to generate an intensity value for each point on the surface being analyzed. One suitable algorithm for the data imaging application 112 is depicted in more detail FIG. 8.

Figure 6A:
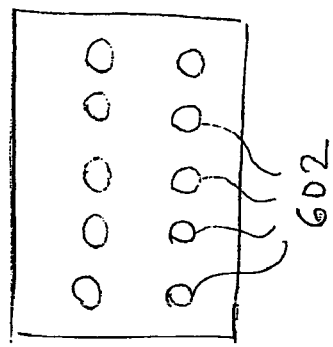
FIG. 6A depicts a seismic array for detecting buried objects, according to an illustrative embodiment of the invention.
Figure 6C:
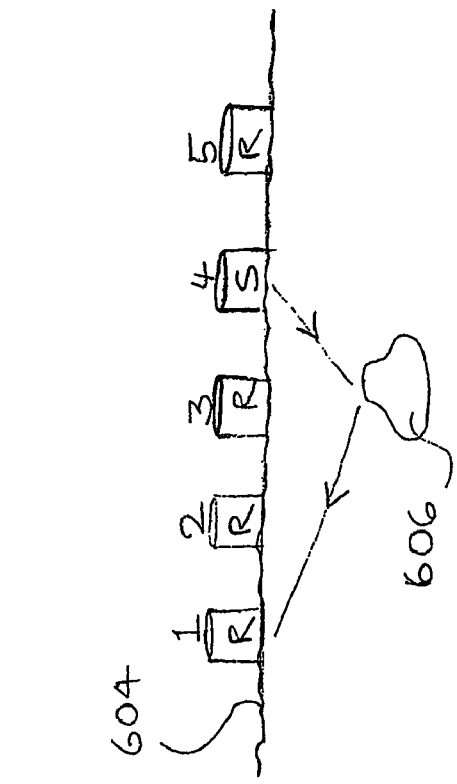
FIGS. 6B and 6C depict operational modes of the seismic array of FIG. 6A, according to an illustrative embodiment of the invention.
Figure 6B:
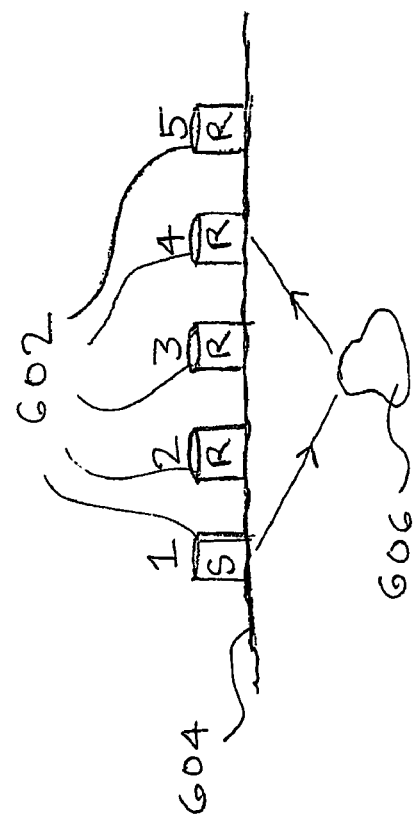

FIG. 6A depicts a seismic array 600 for detecting buried objects, according to an illustrative embodiment of the invention. The seismic array 600 is similar to seismic array 104 or 300, however, it includes ten nodes 602 arranged in two rows each having five nodes 602. The nodes 602 are capable of emitting and detecting signals and are similar to nodes 106 in FIG. 1. As noted earlier, the seismic array 600 is operated such that each node is operated as both a source and a receiver. Such an operation allows for the identification and removal of undesirable artifacts in the data. FIGS. 6B and 6C depict operational modes of the seismic array 600 of FIG. 6A, according to an illustrative embodiment of the invention. In particular, FIG. 6B depicts a front view showing the front row of nodes of the array 600 when placed on a surface 604. The array 600 may be used to detect a buried object 606. The row of nodes 602 includes five nodes in each row that are operated as either a source (identified in FIGS. 6B and 6C as "S") or a receiver (identified in FIGS. 6B and 6C as "R"). In FIG. 6B, the first node 602 is a source while each of the other nodes are receivers. A source signal is emitted from the source node 602; after reflecting off a buried object 606, a response signal is detected by each of the receiver nodes 602. FIG. 6C depicts the array 600 during another time instant when the fourth node 602 in the front row is operated as a source while the first, second, third and fifth nodes 602 in the front row and the five nodes 602 in the rear row are operated as receivers. The fourth node 602 emits a source signal into the surface 604; response signals, including reflections from the buried object 606, are detected at each of the receiver nodes.

Figure 7:
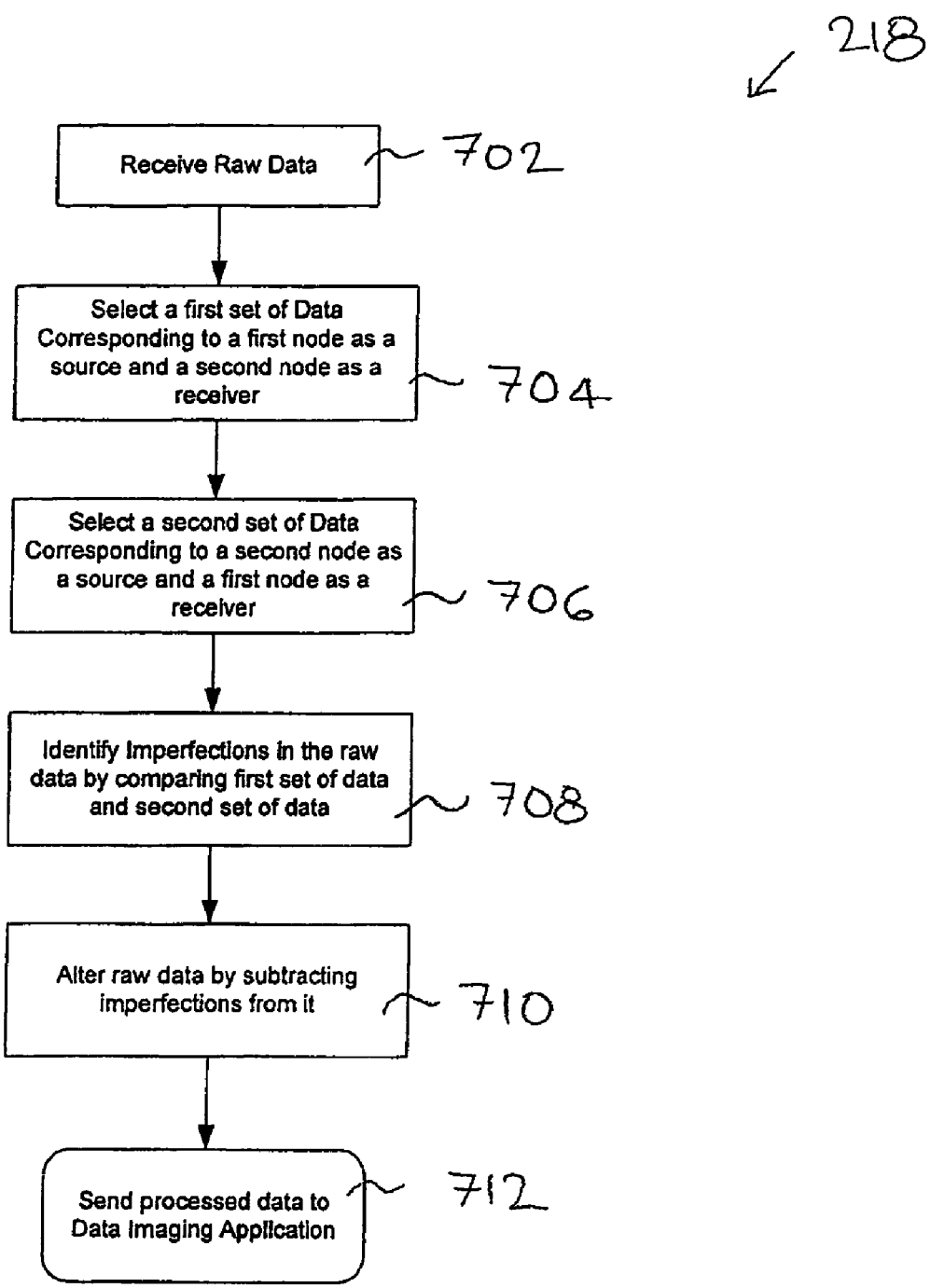
FIG. 7 is a flow chart depicting a scheme for processing data, according to an illustrative embodiment of the invention.

The seismology principle of reciprocity may be applied to suitably process the data obtained from array 600. According to the principle, the seismic response signal for a source location and a receiver location are generally identical when the source and the receiver are interchanged. In one embodiment as shown in FIGS. 6B and 6C, the first and the fourth nodes function as both source and receiver. According the principle, an ideal response signal from the first node to the fourth node (in FIG. 6B) is generally identical to an ideal response signal from the fourth node to the first node (in FIG. 6C). FIG. 7 describes employing the principle of reciprocity to identify and remove undesirable artifacts and noise in the data.

Referring back to FIG. 2, once the array 106 or 300 or 600 has surveyed a desired portion of the surface, the computer system processes the data (step 218). As noted earlier, the array sends the acquired data to the computer system 110 and more particularly the data processing application 112. In certain embodiments, the array 106 sends data to the computer system 110 after acquiring a set of data for a desired portion of the surface. In other embodiments, the array 106 streams data to the computer system 112 at regular fixed or variable intervals of time. In still other embodiments, the array 106 sends the data to the computer system 112 as and when it is acquired.

FIG. 7 is a flow chart depicting, in more detail, a method 218 for processing data, according to an illustrative embodiment of the invention. The data processing application 112, and particularly the noise recognition module 502 receives raw data from the array (step 702). The received raw data may include undesirable artifacts due to variations in seismic source coupling, variations in seismic receiver coupling and local near-surface ground velocity heterogeneity. In certain embodiments the raw data at a particular node k from a particular node j ($D_{jk}$) can be mathematically written as:

$$D_{jk} = S_j * E_{jk} * R_k + N \qquad [1]$$

Where * is a convolution operator, $S_j$ is the transfer function of the source node j coupled to the ground and may include effects in the region of the source node, $R_k$ is the transfer function of a receiver node k coupled to the ground and may include effects in the region of the receiver node, $E_{jk}$ is the wave propagation in the Earth from source node j to receiver node k, and N is noise. In one embodiment, it is desirable to extract signal components corresponding to wave propagation in the Earth, $E_{jk}$ and reduce or eliminate the other components.

In other embodiments, the raw data includes time delays, τ, associated with each component of response signals and can be written as a sum of time delays for each transfer function noted above $$\tau D_{jk} = \tau S_j + \tau E_{jk} + \tau R_k + N \qquad [2]$$

In certain embodiments, a first set of data corresponding to the data acquired when a first node (e.g., node 106a) in the array 104 is selected as a source node and a second node (e.g., node 106b) in the array 104 is selected as a receiver node is compared with a second set of data corresponding to the data acquired when the second node 106b is the source node and the first node 106a is the receiver node (steps 704 and 706). The first and second set of data are compared with each other to identify the undesirable artifacts (step 708). In certain embodiments, bad data from a particular source node or receiver node can be identified. In such embodiments, the first set of data includes raw data from source j to receiver k, $D_{jk}$ and the second set of data includes raw data from source k to receiver j, $D_{kj}$. The noise recognition module 502 cross correlates $D_{jk}$ and $D_{kj}$ and examines the cross correlation coefficient. A cross correlation value less than a predetermined threshold value may indicate that either the source node or the receiver node are poorly coupled to the ground. The noise recognition module 502 analyzes all, or substantially all, the cross correlation coefficients with a common source to determine the integrity of the source. The noise recognition module 502 also analyzes all, or substantially all, the cross correlation coefficients with a common receiver to determine the integrity of the receiver. In other embodiments, the noise recognition module 502 analyzes the time delays of the cross correlations of the reciprocal Source-Receiver data.

In certain embodiments, the data is processed and normalized using homomorphic deconvolution methods to identify transfer functions for the region of the source and receiver. As an example, the data processing application 112 modifies the raw data from source node j to receiver node k by taking a Fourier Transform and then a natural logarithm. In such an example, equation [1] would be altered such that the convolution operators are converted to operators.

$$D_{jk} = S_j + E_{jk} + R_k$$

where italicized variables correspond to the altered/modified transfer functions.

Similarly, modified data from source node k to receiver node j may be written as:

$$D_{kj} = S_k + E_{kj} + R_j$$

The recognition module 502 compares the two data sets, Djk and Dkj, by taking the difference $$D_{jk} - D_{kj} = S_j - S_k + E_{jk} - E_{kj} + R_k - R_j$$

According to principle of reciprocity (as previously described with reference to FIGS. 6A-6C), the transfer function due to the wave propagation through the earth from source j to receiver k is generally the same as that from source k to receiver j. Therefore, in the foregoing example, $$E_{jk} = E_{kj}, \text{ and}$$

$$D_{jk} - D_{kj} = S_j - S_k + R_k - R_j$$

The source and receiver coupling distortion effects at each node j and k can be calculated and consequently used to deconvolve the data. In certain embodiments, for each node, N, there is Source and Receiver distortion. In such embodiments, there are 2N variables. In certain embodiments, When an array of N nodes is operated, the system generates in N(N−1) sets of raw data ("traces"). In such embodiments Trace(j,k) is correlated or compared spectrally with Trace(k, j), thereby resulting in N(N−1)/2 sets of data. In such embodiments, to solve for the source and receiver distortion, the number of variables must be greater then the number of equations. Therefore, 2N>N(N−1)/2 and solving for a value of N gives N>4. In such embodiments, a decomposition is performed when there are a certain number of nodes (typically N>4) used in acquisition to find the unknown transfer functions from the reciprocal data. In one embodiment, $S_k$ and $R_k$ are calculated as an overdetermined linear inverse. In one embodiment, $S_k$ and $R_k$ are used to make the data more phase coherent for imaging through band limited normalization or inverse filtering using the source or receiver transfer function or both.

In still other embodiments, the data processing application 112 modifies the raw data from source node j to receiver node k by considering the time delays of the data. In such an example, equation [1] would be altered such that the convolution operators are converted to operators.

$$\tau D_{jk} = \tau S_j + \tau E_{jk} + \tau R_k + N$$

Similarly, modified data from source node k to receiver node j may be written as:

$$\tau D_{kj} = \tau S_k + \tau E_{kj} + \tau R_j + N$$

The noise recognition module 502 compares the two data sets, $D_{jk}$ and $D_{kj}$, by taking the difference;

$$\tau D_{jk} - \tau D_{kj} = \tau S_j - \tau S_k + \tau E_{jk} - \tau E_{kj} + \tau R_k - \tau R_j + N$$

According to principle of reciprocity (as previously described with reference to FIGS. 6A-6C), the time delay due to the wave propagation through the earth from source j to receiver k is similar to that from source k to receiver j. Therefore, in the foregoing example, $$\tau E_{jk} = \tau E_{kj}, \text{ and}$$

$$\tau D_{jk} - \tau D_{kj} = \tau S_j - \tau S_k + \tau R_k - \tau R_j + N$$

The difference in time delays in the left side can be calculated from the data by cross correlation or other means without departing from the scope of the invention. The source and receiver effects at each node j and k can be calculated from the calculations of all or substantially all pairs of sources and receivers and consequently used to normalize data. In one embodiment, $\tau S_j$ and $\tau R_j$ are determined by solving the above equation as an overdetermined linear inverse problem.

The data processing application 112 includes a data editing module 504 for altering the data based at least in part on the identified undesirable artifacts (step 710). In one embodiment, the source and receiver coupling transfer functions and time delays are subtracted from the raw data to allow for improved signal-to-noise ratios. The data processing application 112 sends the processed data to the data imaging application 116.

The data imaging application 116 converts the processed data to a format suitable for visualization on a display 118. In certain embodiments, the data imaging application 116 receives from the data processing application 112 time series data obtained from each of the receivers for each of the sources, source and receiver positions in any suitable coordinate system, imaging velocity, delay time and spatial sampling of the image volume, specified as minimum-maximum ranges. In certain embodiments, the data imaging application 116 performs near field imaging using a Kirchoff summation imaging method and variations thereof. In such embodiments, the variations of the method include methods using the redundant sets of data obtained from the array. The data imaging application 116 outputs an imaged data set having stacked signal magnitudes (or image intensities) versus spatial position.

In certain embodiments, the data imaging application 116 uses a suitable wave propagation model to derive a relationship between the processed data and an image intensity for display. In one embodiment, the data imaging application 116 assumes a wave propagation model having a fairly straight path, a fairly constant velocity, spherical spreading of the waves from the source node into the ground and back to the receiver, and linear attenuation in dB/meter. In such an embodiment, the wave amplitude at a distance d is modeled as shown in the equation below $$A(t, d) = A_0(t - d/v - \tau) \frac{1}{d^p} 10^{-d\eta/20}$$

where $A_0(t)$ is a propagating wavelet generated by the source with a maximum value at t=0, v is the velocity, $\tau$ is the time delay, $\eta$ is the linear attenuation constant and p is the spreading factor (which is typically 1 for spherical spreading).

In certain embodiments, the data imaging application 116 uses the following relationship to compute the image intensity assuming a suitable wave propagation model.

$$I(\vec{x}) = \sum_i^{N_{src}} \sum_j^{N_{sen}} s_{i,j}(\tau + (d_{src,i} + d_{sen,j})/v) \frac{(d_{src,i} d_{sen,j})^p}{N_{src} N_{sen}} 10^{(d_{src,i} + d_{sen,j})\eta/20} \quad [3]$$

where $s_{i,j}(t)$ is the time series data for source node i and receiver node j, $d_{src,i}$ is the distance from the source i to the location x and $d_{sen,j}$ is the distance from location x to receiver j.

Figure 8:
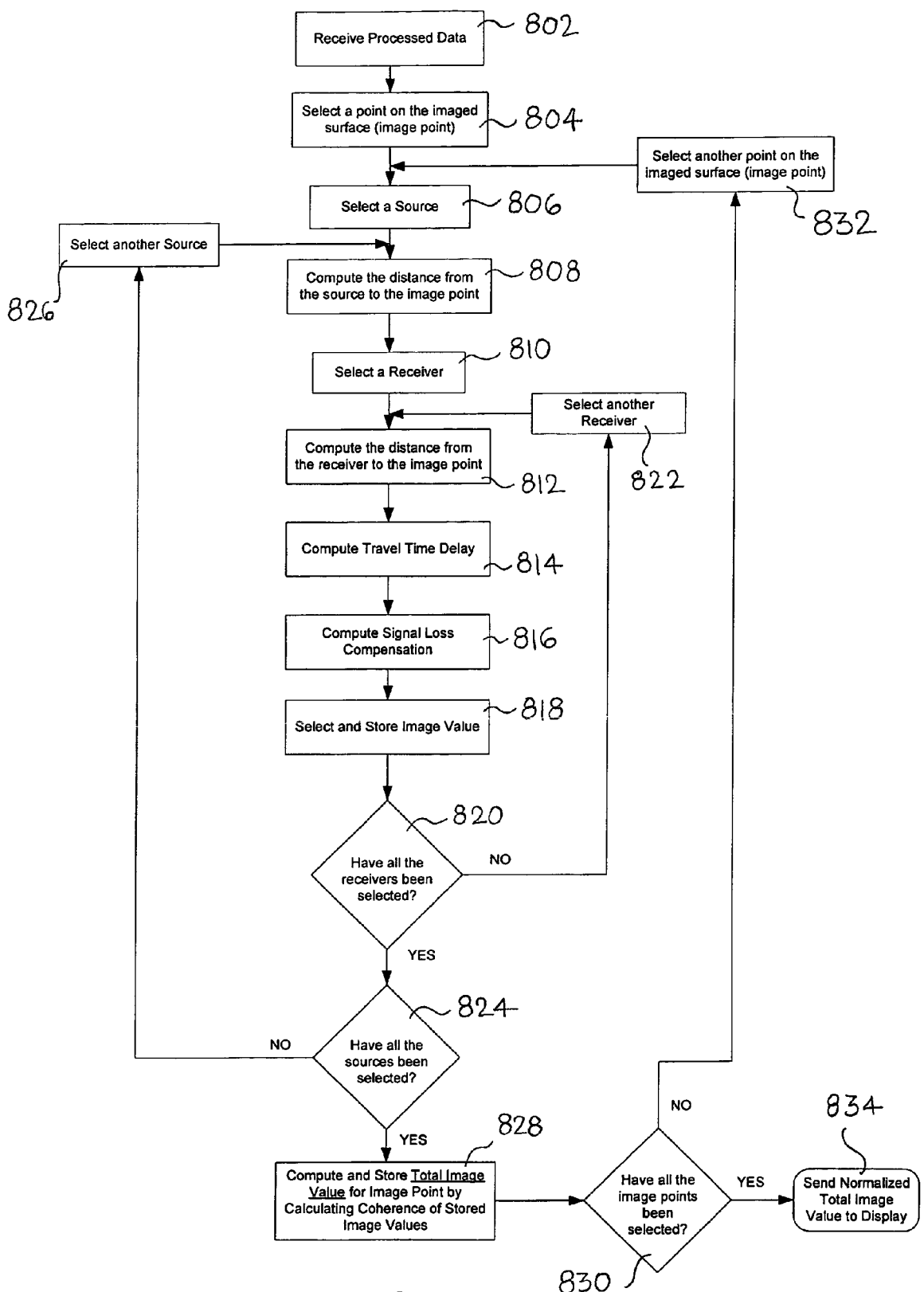
FIG. 8 is a flow chart depicting a scheme for imaging data, according to an illustrative embodiment of the invention.

FIG. 8 is a flow chart depicting a process for imaging data, according to an illustrative embodiment of the invention. In particular, FIG. 8 depicts a process for calculating the image intensities for a spatial region based on equation [3] or a variation thereof. The data imaging application 116 receives the processed data along with other information, as noted above, from the data processing application 112 (step 802). The data imaging application 116 selects an image point corresponding to a spatial position in the surveyed volume below the surface (step 804). The data imaging application 116 selects a source node and array position (step 806) and computes the physical distance from the source node at that array position to the image point (step 808). The data imaging application 116 selects a receiver node and array position (step 810) and computes the physical distance from the receiver node at that array position to the image point (step 812). The data imaging application 116 computes the time delay due to delays in the acquisition system, filters, source nodes, and inaccuracies in the linear model (step 814). The application 116 also computes signal loss compensation factors to compensate for attenuation (step 816).

The data imaging application 116 computes an image intensity value for the selected image point due a selected source and a selected receiver by combining the time series processed data, time delays and loss compensation factors (step 818). The data imaging application 116 determines whether all receivers for a particular source have been considered (step 820) and whether all sources have been selected (step 824). The process (steps 806-820) is repeated until all, or substantially all, the receivers and sources have been considered and the image values due to each have been calculated. In one embodiment, the data imaging application 116 computes a total image value for the selected image point by stacking (summing) the intensity values at that image point due to each of the sources and receivers (step 829).

The data applications 116 checks to see if all desired image points have been selected (step 830) and then sends the image intensity values for all the image points to the display 118 for visualization.

In certain embodiments, for a particular image point, the processed data from all the nodes in the array are used to calculate the image intensity at that point. In certain embodiments, for a particular image point, the processed data obtained from a subset of nodes in the array are used to calculate the image intensity at that point. In such embodiments, the computer system 110 selects a particular set of nodes based at least in part on the location of the image point with respect to the nodes, the path of a seismic signal from source to the image point and the path of a seismic signal from the image point to the receiver. In one embodiment, the path of the seismic signal from the source node to the image point and the path from the image point to the receiver node is limited to a range of angles in a cone of about 40 degrees around the vertical. Such an embodiment, helps reduce the effects of shear wave and multimode noise interference from signals traveling at higher angles.

In certain embodiments, the image intensity value at an image point is calculated from equation [3] at step 828, such that image intensity values are summed from each data channel from a single time sample. In such embodiments, a time sample index is calculated taking into account two way seismic travel time, seismic wave speed and a time delay factor. In certain embodiments, the image intensity value at a particular image point is calculated by coherently summing the image intensity values over a range of time values about the time sample index value. In such embodiments, the use of a time range allows an increase in the signal-to-noise ratios and reduces random noise.

In certain embodiments, the image intensity values for each image point is normalized to represent a coherence value. In such embodiments, the coherence value includes a ratio of the image intensity sum obtained from step 828 to computed energy of noise. In such an embodiment, for maximum signal coherence from an image point and random noise, the normalized coherence value would yield 10 log(N), where N is the number of channels in the summation. Such a normalizing scheme allows for identifying subsurface targets while minimizing the need for normalizing for attenuation and spreading.

The process described herein may be executed on a conventional data processing platform such as an IBM PC-compatible computer running the Windows operating systems, a SUN workstation running a UNIX operating system or another equivalent personal computer or workstation. Alternatively, the data processing system may comprise a dedicated processing system that includes an embedded programmable data processing unit. For example, the data processing system may comprise a single board computer system that has been integrated into a system for performing micro-array analysis.

The process described herein may also be realized as a software component operating on a conventional data processing system such as a UNIX workstation. In such an embodiment, the process may be implemented as a computer program written in any of several languages well-known to those of ordinary skill in the art, such as (but not limited to) C, C++, FORTRAN, Java or BASIC. The process may also be executed on commonly available clusters of processors, such as Western Scientific Linux clusters, which are able to allow parallel execution of all or some of the steps in the present process.

As noted above, the order in which the steps of the present method are performed is purely illustrative in nature. In fact, the steps can be performed in any order or in parallel, unless otherwise indicated by the present disclosure.

The method of the present invention may be performed in either hardware, software, or any combination thereof, as those terms are currently known in the art. In particular, the present method may be carried out by software, firmware, or microcode operating on a computer or computers of any type. Additionally, software embodying the present invention may comprise computer instructions in any form (e.g., source code, object code, interpreted code, etc.) stored in any computer-readable medium (e.g., ROM, RAM, magnetic media, punched tape or card, compact disc (CD) in any form, DVD, etc.). Furthermore, such software may also be in the form of a computer data signal embodied in a carrier wave, such as that found within the well-known Web pages transferred among devices connected to the Internet. Accordingly, the present invention is not limited to any particular platform, unless specifically stated otherwise in the present disclosure.

The invention may be embodied in other specific forms without departing from the spirit or essential characteristics thereof. The forgoing embodiments are therefore to be considered in all respects illustrative, rather than limiting of the invention.

The invention claimed is:

1. A method of subsurface imaging, comprising
providing an array of nodes including, at least a first node and a second node that are each capable of emitting and detecting signals; and
acquiring a set of array seismic data by, iteratively:
positioning the array of nodes adjacent a surface, at a first location,
emitting a source signal by the first node at the first location and detecting a first response signal by the second node, thereby acquiring a first set of seismic data corresponding to the first location,
emitting a source signal from at least the second node in the array of nodes and receiving a response signal in at least the first node in the array of nodes, thereby acquiring a second set of seismic data corresponding to the first location.

2. The method of claim 1, further comprising moving the array of nodes to another location and repeating the steps of emitting by the first node and emitting by the second node.

3. The method of claim 1, further comprising identifying imperfections in the first and second sets of seismic data, at least in part, by comparing the first set of seismic data with the second set of seismic data.

4. The method of claim 3, further comprising imaging the subsurface by altering at least one of the first and second sets of seismic data based, at least in part, on the identified imperfections.

5. The method of claim 3, wherein comparing the first set of seismic data with the second set of seismic data includes cross correlating the first set of seismic data with the second set of seismic data and examining a normalized cross correlation coefficient to identify imperfections.

6. The method of claim 3, wherein identifying imperfections includes calculating a time delay associated with at least one of the first node and the second node by subtracting a time delay of the first set of seismic data from a time delay of the second set of seismic data.

7. The method of claim 6, further comprising imaging the subsurface by altering at least one of the first and second sets of seismic data based, at least in part, on the identified imperfections.

8. The method of claim 7, wherein altering at least one of the first and second sets of seismic data includes removing the time delay associated with the first node and the time delay associated with the second node.

9. The method of claim 3, wherein identifying imperfections includes correlating the first set of seismic data with the second set of seismic data and calculating a transfer function associated with the first node and a transfer function associated with the second node by decomposing the correlation of the first set and second sets of seismic data.

10. The method of claim 6, further comprising imaging the subsurface by altering at least one of the first and second sets of seismic data based, at least in part, on the identified imperfections.

11. The method of claim 10, wherein altering at least one of the first and second sets of seismic data includes removing the transfer function associated with the first node and the transfer function associated with the second node.

12. The method of claim 1, wherein the array of nodes includes five or more nodes, each capable of emitting and detecting signals.

13. The method of claim 12, wherein at least one of the first and second sets of seismic data includes response signals detected at all the nodes in the array of nodes.

14. The method of claim 4, wherein altering at least one of the first and second sets of data includes normalizing the identified imperfections.

15. The method of claim 1, wherein the source signal is emitted to a region below the surface and the response signal includes a component of the source signal modified by interactions with the region below the surface.

16. The method of claim 15, wherein the response signal further includes a component corresponding to the effect of seismic coupling between the surface and at least one of the first node and second node.

17. The method of claim 3, wherein the imperfections in the set of array seismic data include at least one of the variation of seismic coupling between the surface and at least one of the first node and second node, delay and/or distortion of the source signal due to near surface subsurface heterogeneity, interfering waves, seismic reverberation and random noise.

18. The method of claim 1, wherein the array of nodes includes a plurality of nodes and is configured to acquire at least 500 sets of seismic data.

19. The method of claim 2, wherein the array of nodes includes a plurality of nodes and is configured to acquire at least 500 sets of seismic data.

20. The method of claim 4, wherein the subsurface includes at least one object and the method further comprises detecting a subsurface object based, at least in part, on the imaged subsurface.

21. An apparatus for imaging a subsurface volume, comprising
an array of nodes, including at least a first node and a second node, each capable of emitting and detecting signals, for acquiring a set of array seismic data, and
a computer in communication with the array of nodes for processing and imaging the acquired data,
wherein array of nodes is adapted to acquire a first set of seismic data by emitting a source signal from the first node and detecting a response signal at the second node, and a second set of seismic data by emitting a source signal from the second node and detecting a response signal at the first node, and wherein the computer is configured to identify imperfections in the first and second sets of seismic data and image the subsurface by removing imperfections in at least one of the first and the second sets of seismic data.

22. The apparatus of claim 21, wherein the array of nodes includes five or more nodes.

23. The apparatus of claim 21, wherein the nodes in the array of nodes are separated by a distance of about 20 cm.

24. The apparatus of claim 21, wherein the computer includes a data processing application for processing the acquired data.

25. The apparatus of claim 21, wherein the computer includes a data imaging application for imaging the acquired data.

26. The apparatus of claim 21, wherein the array of nodes includes a motion module for moving the array from one location to another location.

27. The apparatus of claim 26, wherein the motion module includes at least one of a wheel, a roller, a motor and an electronic motor controller circuit.

28. The apparatus of claim 21, wherein the computer includes an array control application for controlling the movement of the array of nodes.

* * * * *

UNITED STATES PATENT AND TRADEMARK OFFICE
CERTIFICATE OF CORRECTION

PATENT NO. : 7,440,853 B2  Page 1 of 1
APPLICATION NO. : 11/582222
DATED : October 21, 2008
INVENTOR(S) : Peter A. Krumhansl et al.

It is certified that error appears in the above-identified patent and that said Letters Patent is hereby corrected as shown below:

Title Page;

In Item 73, please replace "BBN Technologies, Corp., Cambridge, MA (US)" with

-- BBN Technologies, Corp., Cambridge, MA (US) and Underground Imaging Technologies, Inc., Latham, NY (US) --

Signed and Sealed this

Eleventh Day of August, 2009

David J. Kappos
*Director of the United States Patent and Trademark Office*